United States Patent
Oh et al.

(10) Patent No.: US 10,479,860 B2
(45) Date of Patent: *Nov. 19, 2019

(54) METHOD FOR PREPARING HIGHLY TRANSPARENT AND HIGHLY HEAT-RESISTANT POLYCARBONATE ESTER

(71) Applicant: SK CHEMICALS CO., LTD., Seongnam-si, Gyeonggi-do (KR)

(72) Inventors: Kwang Sei Oh, Seoul (KR); Jong-In Lee, Seongnam-si (KR)

(73) Assignee: SK CHEMICALS CO., LTD., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/540,052

(22) PCT Filed: Jan. 12, 2016

(86) PCT No.: PCT/KR2016/000279
§ 371 (c)(1),
(2) Date: Jun. 27, 2017

(87) PCT Pub. No.: WO2016/117872
PCT Pub. Date: Jul. 28, 2016

(65) Prior Publication Data
US 2017/0369641 A1 Dec. 28, 2017

(30) Foreign Application Priority Data
Jan. 22, 2015 (KR) .......................... 10-2015-0010826

(51) Int. Cl.
*C08G 63/78* (2006.01)
*C08G 63/64* (2006.01)
*C08G 63/66* (2006.01)
*C08G 63/672* (2006.01)

(52) U.S. Cl.
CPC .............. *C08G 63/64* (2013.01); *C08G 63/66* (2013.01); *C08G 63/672* (2013.01); *C08G 63/78* (2013.01)

(58) Field of Classification Search
CPC combination set(s) only.
See application file for complete search history.

(56) References Cited

U.S. PATENT DOCUMENTS 3,476,785 A * 11/1969 Huelsmann .............. B01J 31/04
554/167
4,129,594 A * 12/1978 Baker ...................... C07C 63/30
562/854
4,194,038 A * 3/1980 Baker ...................... C08G 63/64
528/182
2008/0015331 A1 * 1/2008 Terado .................... C08G 63/64
528/271
2009/0105444 A1 4/2009 Chatterjee et al.
2010/0105854 A1 4/2010 Miyake et al.

FOREIGN PATENT DOCUMENTS

| EP | 2123692 A1 | 11/2009 |
|---|---|---|
| KR | 10-2010-0029768 A | 3/2010 |
| KR | 10-2014-0097918 A | 8/2014 |
| KR | 10-2015-0003686 A | 1/2015 |
| KR | 10-2015-0004085 A | 1/2015 |
| WO | 2012/078825 A1 | 6/2012 |
| WO | 2013157661 A1 | 10/2013 |
| WO | 2015012619 A1 | 1/2015 |

OTHER PUBLICATIONS

Okada et al."Biodegradable Polymers Based on Renewable Resources"(,J Appl Polym. Sci. 86, pp. 872-880, 2002).*
Yoon et al "Advanced Polymerization and Properties of Biobased High Tg polyester of Isosorbide and 1,4-Cyclohexanedicarboxylic Acid through in Situ Acetylation" ( Macromolecules, Apr. 3, 2013, pp. 2930-2940).*
European Patent Office; Communication dated Aug. 17, 2018 in counterpart application No. 16740345.0.
International Search Report of PCT/KR2016/000279 dated May 30, 2016, [PCT/ISA/210].
Written Opinion of PCT/KR2016/000279 dated May 30, 2016, [PCT/ISA/237].

* cited by examiner

*Primary Examiner* — Ling Siu Choi
*Assistant Examiner* — Gennadiy Mesh
(74) *Attorney, Agent, or Firm* — Sughrue Mion, PLLC

(57) ABSTRACT

A method for preparing a bio-based polycarbonate ester containing a repeating unit according to Formula 1 which comprises residue of Isosorbide and residue of CHDA (1,4-cyclohexanedicarboxylic acid). The method includes a nucleophilic reaction with phenol to prepare a 1,4-diphenyl-cyclohexanedicarboxylate, followed by a polycarbonate melt polycondensation reaction Formula 1

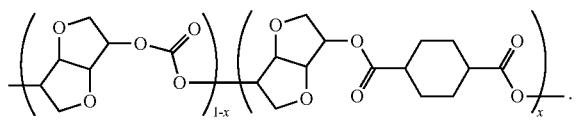

11 Claims, 4 Drawing Sheets

METHOD FOR PREPARING HIGHLY TRANSPARENT AND HIGHLY HEAT-RESISTANT POLYCARBONATE ESTER

CROSS REFERENCE TO RELATED APPLICATIONS

This application is a National Stage of International Application No. PCT/KR2016/000279 filed Jan. 12, 2016, claiming priority based on Korean Patent Application No. 10-2015-0010826 filed Jan. 22, 2015, the contents of all of which are incorporated herein by reference in their entirety.

TECHNICAL FIELD

The present invention relates to a novel process for preparing a polycarbonate ester having excellent transparency and high heat resistance. Specifically, it relates to a process for preparing a bio-based polycarbonate ester having a repeating unit derived from a reaction of 1,4:3,6-dianhydrohexitol, a carbonate, and 1,4-cyclohexanedicarboxylate.

BACKGROUND ART

Unlike conventional materials for the petrochemical industry, 1,4:3,6-dianhydrohexitol is a bio-based material derived from a biomass, i.e., a renewable resource containing polysaccharide as its components such as corn, wheat, potato, and the like. Particularly, a bioplastic containing a bio-based material has attracted attention as a material for reducing generation of carbon dioxide, thereby addressing the worldwide issue of global warming, since carbon dioxide generated while such a bioplastic is degraded after its use can be reused for the growth of a biomass.

1,4:3,6-Dianhydrohexitol has the following three stereoisomer types, which have different chemical properties depending on the relative configuration of the two hydroxyl groups: isomannide (Formula a below, mp: 81-85° C.), isosorbide (Formula b below, mp: 61-62° C.), and isoidide (Formula c below, mp: 64° C.).

[Formula a]
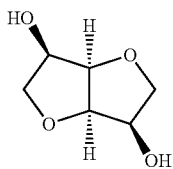

[Formula b]
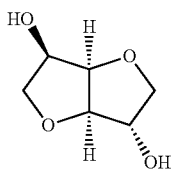

[Formula c]
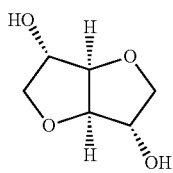

Particularly, in case 1,4:3,6-dianhydrohexitol is used as a monomer for preparing a polycarbonate, a representative engineering plastic, the polycarbonate thus prepared can have good thermal and optical properties attributable to the molecular structural characteristics of 1,4:3,6-dianhydrohexitol, i.e., chirality and rigid saturated heterocyclic structure, together with the advantages of a bioplastic. For this reason, 1,4:3,6-dianhydrohexitol has been widely used as a representative raw material for developing bioplastics.

Meanwhile, 1,4-dimethyl-cyclohexane dicarboxylate (hereinafter abbreviated as "DMCD") or 1,4-cyclohexanedicarboxylic acid (hereinafter abbreviated as "CHDA"), a hydrolysis product of DMCD, has a cyclohexane ring structure in its molecule center. Thus, if it is incorporated into a polymer chain, it improves not only the weatherability and UV stability of the polymer, but also such properties of the polymer as gloss retention, yellowing resistance, hydrolytic stability, corrosion resistance, and chemical resistance, owing to the unique combination of flexibility and hardness in the molecular structure.

Poly(1,4-cyclohexylidene 1,4-cyclohexanedicarboxylate) (hereinafter abbreviated as "PCCD"), a DMCD/cyclohexanedimethanol (hereinafter abbreviated as "CHDM") homopolyester, is an example of commercially available polymer materials prepared from DMCD. By virtue of its superior weatherability, chemical resistance, flowability, and a low refractive index, PCCD has been used in developing a polycarbonate/PCCD alloy (brand name: Xyrex) by DuPont (USA) for the purpose of improving transparency of a polycarbonate.

A commercial process of manufacturing a polycarbonate can be divided into solution polymerization and melt polycondensation. Unlike the solution polymerization process where phosgene is used as a source for a carbonate, diphenyl carbonate (hereinafter abbreviated as "DPC") is used in the melt polycondensation process. Thus, the raw materials used in the conventional melt polycondensation process generally comprise DPC and bisphenol A (hereinafter abbreviated as "BPA") as a diol; and transesterification of BPA and DPC produces phenol as a by-product of the melt polycondensation.

The present inventors have developed a novel process for preparing an isosorbide-based polycarbonate ester, which is prepared from 1,4-diphenyl-cyclohexanedicarboxylate (hereinafter abbreviated as "DPCD") derived from DMCD or CHDA.

The present invention employs DPCD as a material for forming an ester bond in polymer chains in the preparation of an isosorbide-based polycarbonate ester (or a polyester carbonate). The polycarbonate ester thus obtained is a novel bioplastic having excellent transparency and high heat resistance whose properties for certain usage and molding processability can be adjusted by varying the content of DPCD. The bio-based polycarbonate ester according to the present invention has excellent heat resistance, surface hardness, and impact strength as compared with the conventional bioplastic disclosed in US Patent Application Publication No. 2011/0003101 and U.S. Pat. No. 8,399,598.

DISCLOSURE OF INVENTION

Technical Problem

An object of the present invention is to provide a novel process for preparing a polycarbonate ester having high heat resistance and transparency, along with a high degree of polymerization and good mechanical properties, the polycarbonate ester comprising a rigid polymer repeating unit without BPA that may generate an environmental hormone and being useful in various applications such as a substitute for automobile glass, an optical lens or film, a feeding bottle, a food container, etc.

Solution to Problem

The present invention provides a method for preparing a bio-based polycarbonate ester, comprising the steps of:

(1) converting a compound of Formula 2 into an intermediate reactant having a functional group that is readily detached and then subjecting the intermediate reactant to a nucleophilic reaction with phenol to yield a compound of Formula 3; and (2) subjecting the compound of Formula 3 prepared in step (1), a compound of Formula 4, and 1,4:3,6-dianhydrohexitol to a polycarbonate melt polycondensation reaction to yield the bio-based polycarbonate ester comprising a repeating unit of Formula 1:

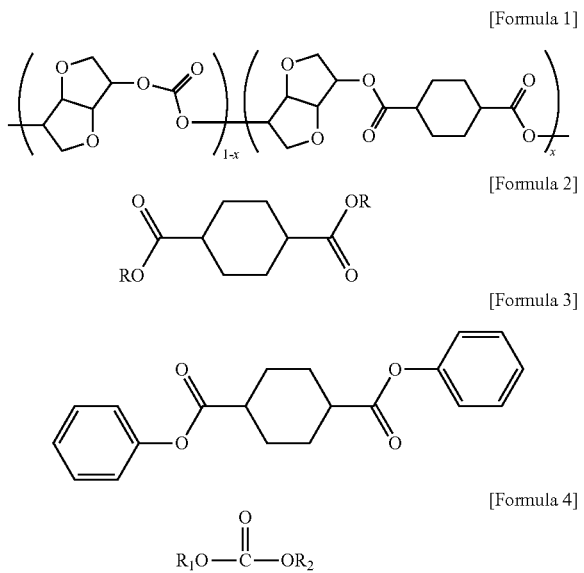

[Formula 1]

[Formula 2]

[Formula 3]

[Formula 4]

wherein
R is methyl or hydrogen,
$R_1$ and $R_2$ are each independently a substituted or unsubstituted $C_1$-$C_{18}$ aliphatic group, or a substituted or unsubstituted $C_1$-$C_{18}$ aromatic group, and
x is a real number of 0<x<1.

Advantageous Effects of Invention

In the method of the present invention for preparing a bio-based polycarbonate ester, DPCD of high purity and high whiteness is produced in a high yield, compared with conventional methods, through a nucleophilic reaction of an intermediate reactant having a functional group that is readily detached with phenol, thereby lowering the production costs. The bio-based polycarbonate ester prepared by the method of the present invention has high transparency and high thermal resistance, and can be effectively used in various applications such as a substitute for automobile glass, an optical lens or film, a feeding bottle, a food container, and so on.

BEST MODE FOR CARRYING OUT THE INVENTION

Figure 1:
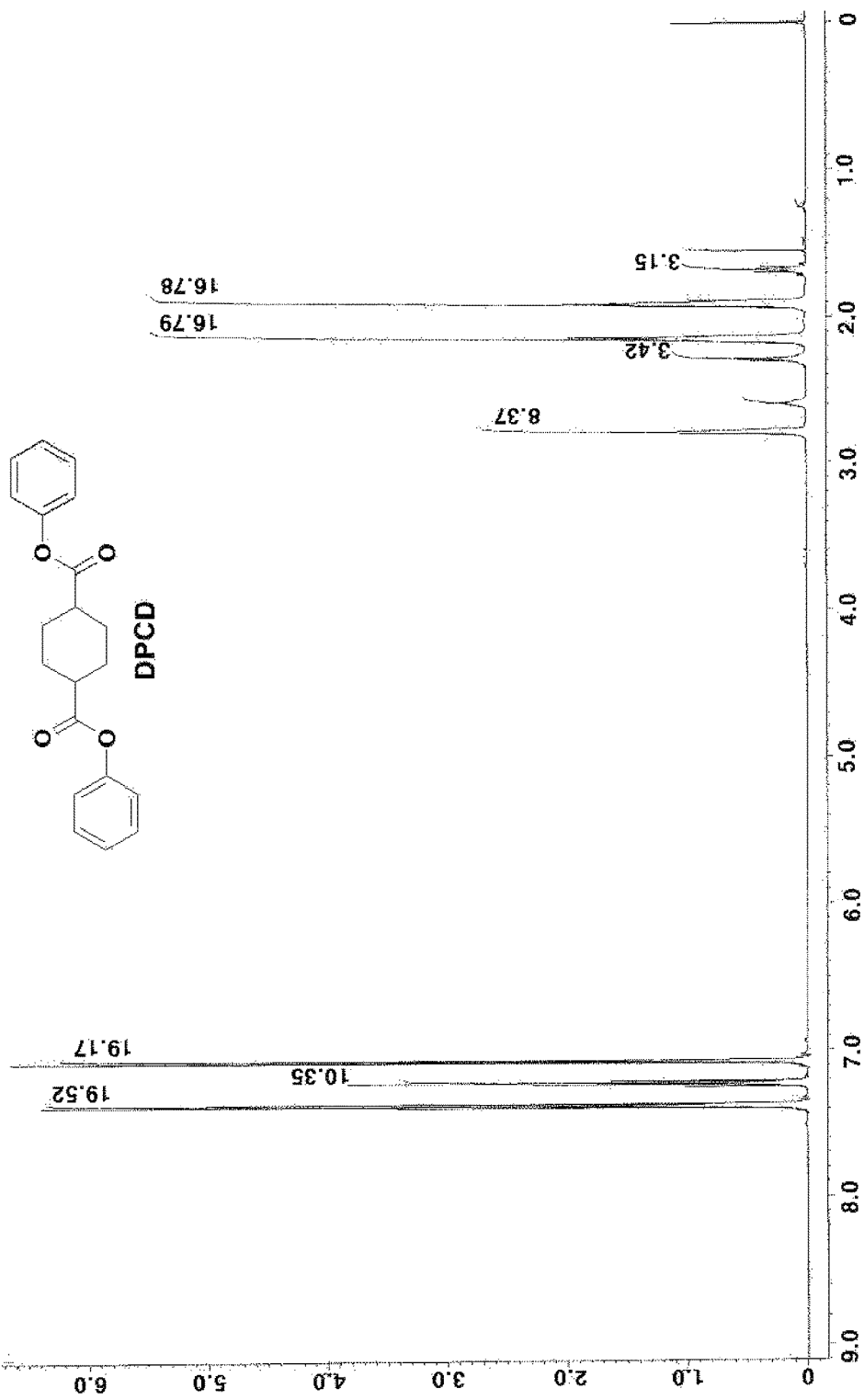
FIG. 1 is a $^1$H NMR spectrum of DPCD.

Hereinafter, the present invention will be described in detail.

The present invention provides a method for preparing a bio-based polycarbonate ester, comprising the steps of:

(1) converting a compound of Formula 2 into an intermediate reactant having a functional group that is readily detached and then subjecting the intermediate reactant to a nucleophilic reaction with phenol to yield a compound of Formula 3; and (2) subjecting the compound of Formula 3 prepared in step (1), a compound of Formula 4, and 1,4:3,6-dianhydrohexitol to a polycarbonate melt polycondensation reaction to yield the bio-based polycarbonate ester comprising a repeating unit of Formula 1:

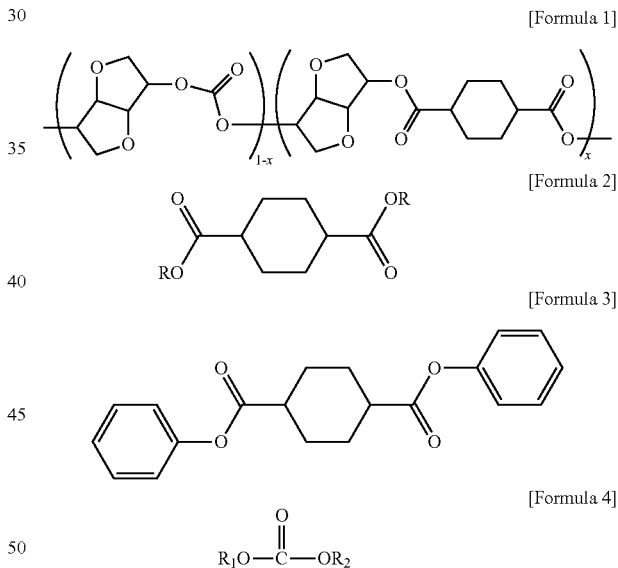

[Formula 1]

[Formula 2]

[Formula 3]

[Formula 4]

wherein
R is methyl or hydrogen,
$R_1$ and $R_2$ are each independently a substituted or unsubstituted $C_1$-$C_{18}$ aliphatic group, or a substituted or unsubstituted $C_1$-$C_{18}$ aromatic group, and
x is a real number of 0<x<1.

In step (1), a compound of Formula 2 is converted into an intermediate reactant having a functional group that is readily detached, and the intermediate reactant is subjected to a nucleophilic reaction with phenol to prepare a compound of Formula 3, i.e., 1,4-diphenyl-cyclohexanedicarboxylate.

Specifically, in step (1) above, DMCD (a compound of Formula 2 wherein R is methyl) or CHDA (a compound of Formula 2 wherein R is H) is converted into an intermediate reactant having a functional group that is readily detached. Then the intermediate reactant is subjected to a nucleophilic reaction with phenol to prepare DPCD, which is subjected to a transesterification reaction with a diol in subsequent step (2), thereby producing phenol as a by-product.

The intermediate reactant having a functional group that is readily detached in step (1) may be a compound represented by Formula 2a below:

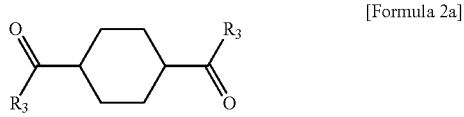

[Formula 2a]

wherein $R_3$ is F, Cl, or Br.

In an embodiment of the present invention, the compound of Formula 2a may be 1,4-cyclohexanedicarbonyl chloride (hereinafter, "CHDC").

That is, in step (1) above, DMCD wherein R is methyl or CHDA wherein R is hydrogen in Formula 2 may be converted into an intermediate compound, CHDC, which may be reacted with phenol to produce DPCD (see Reaction Scheme 1 below).

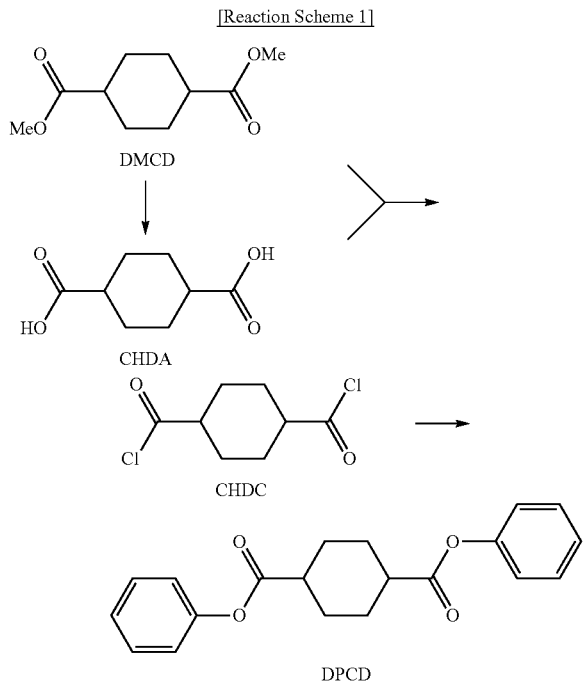

[Reaction Scheme 1]

A primary, secondary, or tertiary dicarboxylate, or a dicarboxylic acid may be used, depending on the desired properties, together with the compound of Formula 2, which is a raw material for forming an ester bond in the polymer chains of the polycarbonate according to the present invention. They may be converted into other diphenyl esters than the compound of Formula 3 through a nucleophilic reaction with phenol. These diphenyl esters, along with the compound of Formula 3, participate in the polycarbonate melt polycondensation.

The diphenyl ester compounds other than the compound of formula 3 may be one kind or a mixture of two or more kinds.

In order for the bio-based polycarbonate ester of the present invention to have high heat resistance and transparency, along with improved weatherability and UV stability, the dicarboxylate or dicarboxylic acid other than the compound of Formula 2 may have a single or fused saturated homocyclic or heterocyclic ring in its molecular center, for example, at least one dicarboxylate or dicarboxylic acid compound selected from the group consisting of: tetrahydro-2,5-dimethyl-furandicarboxylate, 1,2-dimethyl-cyclohexanedicarboxylate, 1,3-dimethyl-cyclohexanedicarboxylate, decahydro-2,4-dimethyl-naphthalenedicarboxylate, decahydro-2,5-dimethyl-naphthalenedicarboxylate, decahydro-2,6-dimethyl-naphthalenedicarboxylate, decahydro-2,7-dimethyl-naphthalenedicarboxylate, tetrahydro-2,5-furandicarboxylic acid, 1,2-cyclohexanedicarboxylic acid, 1,3-cyclohexanedicarboxylic acid, decahydro-2,4-naphthalenedicarboxylic acid, decahydro-2,5-naphthalenedicarboxylic acid, decahydro-2,6-naphthalenedicarboxylic acid, and decahydro-2,7-naphthalenedicarboxylic acid. Preferred are decahydro-2,6-dimethyl-naphthalenedicarboxylate or decahydro-2,6-naphthalenedicarboxylic acid and such a compound obtainable from a bio-based material as tetrahydro-2,5-dimethyl-furandicarboxylate or tetrahydro-2,5-furandicarboxylic acid.

The intermediate reactant in step (1) may be obtained by a reaction of the compound represented by Formula 2 with a compound selected from the group consisting of phosgene, triphosgene, thionyl chloride, oxalyl chloride, phosphorus trichloride, phosphorous pentachloride, phosphorous pentabromide, and cyanuric fluoride. Preferably, for easy removal of by-products of the reaction, a chlorinating agent such as phosgene, thionyl chloride, and oxalyl chloride may be used. More preferably, from a commercial point of view, the chlorinating agent may be phosgene.

The chlorinating agent may be used in an amount of 1 to 4 times, preferably 1.02 to 3 times, more preferably 1.05 to 2.5 times, the total moles of the compound of Formula 2.

Further, the reaction temperature may vary depending on the compound of Formula 2 and the chlorinating agent. Generally, the temperature may be −30 to 150° C., preferably 15 to 100° C., more preferably 20 to 80° C. The reaction time may be 5 minutes to 48 hours, preferably 10 minutes to 24 hours.

In the reaction of the compound of Formula 2 with the chlorinating agent, an organic solvent may be used to dissolve or disperse the compound of Formula 2. The organic solvent may include, for example, benzene, toluene, xylene, mesithylene, methylene chloride, dichloroethane, chloroform, carbon tetrachloride, monochlorobenzene, o-dichlorobenzene, tetrahydrofuran, dioxane, and acetonitrile. If the compound of Formula 2 melts at the above reaction temperature ranges, however, the reaction may be carried out without organic solvents.

Meanwhile, if the intermediate reactant is liquid at room temperature, it may serve as a solvent, which saves the expense for solvents and is thus advantageous from a commercial point of view.

A catalyst may be further added in order to increase the conversion rate of the intermediate reactant and the reaction yield. The catalyst is not particularly limited and may be an organic or inorganic catalyst. The organic catalyst may include, for example, dimethyl formamide, dimethyl acetamide, methyl pyrrolidone, dimethyl imidazolidinone, tetramethyl urea, tetraethyl urea, and tetrabutyl urea. The inorganic catalyst may include, for example, aluminum chloride ($AlCl_3$), iron chloride ($FeCl_3$), bismuth chloride ($BiCl_3$), gallium chloride ($GaCl_3$), antimony pentachloride (SbCl$_5$), boron trifluoride (BF$_3$), bismuth trifluoromethanesulfonate (Bi(OTf)$_3$), titanium tetrachloride (TiCl$_4$), zirconium tetrachloride (ZrCl$_4$), titanium tetrabromide (TiBr$_4$), and zirconium tetrabromide (ZrBr$_4$). Concretely, the organic catalyst may be selected from the group consisting of dimethyl formamide, tetramethyl urea, and dimethyl imidazolidinone; and the inorganic catalyst may be selected from the group consisting of aluminum chloride and titanium tetrachloride. More preferably, from a commercial point of view, the organic catalyst may be dimethyl formamide, and the inorganic catalyst may be aluminum chloride.

The amount of catalyst is not particularly limited and can vary depending on the kinds of the compound of Formula 2 and of the chlorinating agent. The catalyst may be used in an amount of 0.1 to 10 mol %, preferably 0.5 to 5 mol %, more preferably 1 to 3 mol %, based on the total moles of the compound of Formula 2. When the amount of the catalyst is less than the above ranges, the reaction rate is slow. On the other hand, an amount exceeding the above ranges makes it highly likely to cause a runaway and exothermic reaction, rather than to accelerate the reaction rate.

Meanwhile, phenol for converting the intermediate reactant into the compound of Formula 3 may be used in an amount of 1 to 3 times, preferably 1.5 to 2.5 times, the total moles of the compound of Formula 2. When the amount of phenol falls out of the above ranges, the final yield of the compound of Formula 3 may be low.

In Step (2), the compound of Formula 3 obtained in Step (1), the compound of Formula 4, and 1,4:3,6-dianhydrohexitol are subjected to a polycarbonate melt polycondensation reaction to yield a compound comprising the repeating unit of Formula 1.

In Step (2) above, the reaction of 1,4:3,6-dianhydrohexitol with the compound of Formula 4 forms a carbonate bond (Repeating Unit 1), and the reaction of 1,4:3,6-dianhydrohexitol with the compound of Formula 3 forms an ester bond (Repeating Unit 2). A repeating unit containing these bonds is represented by Formula 1 above.

If the amount of 1,4:3,6-dianhydrohexitol is 1 mole and the amount of the compound of Formula 3 is x mole, the amount of compound of Formula 4 used is to be determined as (1−x) mole, as shown in Reaction Scheme 2 below:

[Reaction Scheme 2]

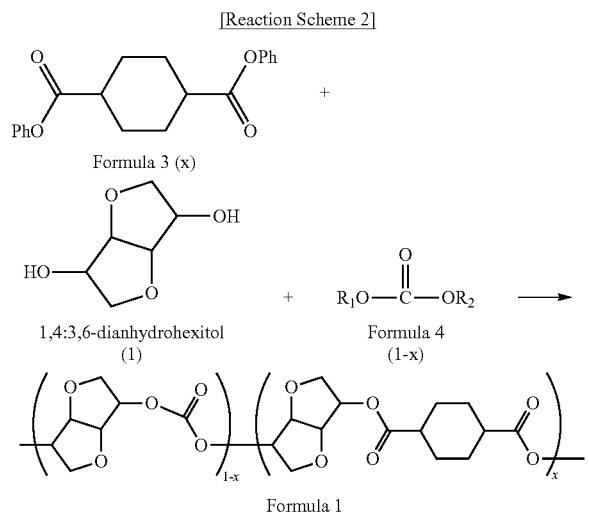

Formula 1

Figure 2:
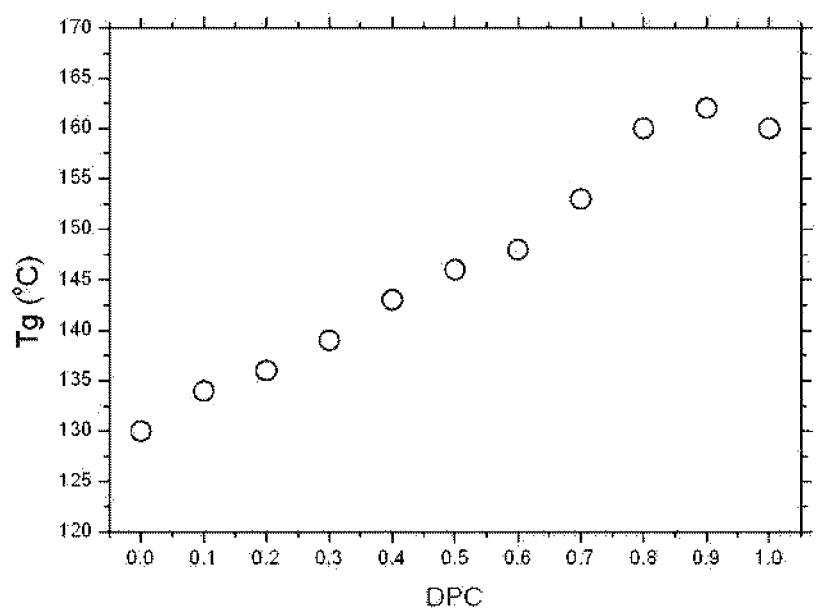
FIG. 2 is a graph showing changes in the glass transition temperature (Tg) of a polymer with the content of DPC.

For example, in case where 1,4:3,6-dianhydrohexitol and the compound of Formula 4, absent the compound of Formula 3, are subjected to the melt polycondensation, a 1,4:3,6-dianhydrohexitol homopolycarbonate (Tg 160° C.) is produced. As the amount of the compound of Formula 3 increases, the amount of ester bonds in the polymer chains increases as well. If the amount of the compound of Formula 3 becomes 1, the melt polycondensation only takes place between 1,4:3,6-dianhydrohexitol and the compound of Formula 3, thereby producing a homopolyester (Tg 130° C.; see *Macromolecules*, 2013, 46, 2930). FIG. 2 illustrates the changes in Tg of a polymer with the ratio of the compound of Formula 4.

In conclusion, the ratio of carbonate to ester bonds in the polymer chains varies depending on the amount of the compound of Formula 3 added. If carbonate and ester bonds coexist in the polymer chains, the polycarbonate ester of the present invention has a higher heat resistance than that of the 1,4:3,6-dianhydrohexitol polycarbonate as disclosed in US Patent Application Publication No. 2011/0003101 and U.S. Pat. No. 8,399,598. Polycarbonates generally show high heat resistance and good mechanical properties over polyesters, but have relatively poor chemical resistance, residual stress, and molding cycle time. A polycarbonate ester comprising both of carbonate and ester bonds in a single chain, however, not only redresses the drawbacks of polymers having each bond type alone, but also has other advantages.

1,4:3,6-Dianhydrohexitol may be selected from the group consisting of isomannide, isosorbide, and isoidide. Preferred is isosorbide.

Further, it is very important to maintain a high purity of 1,4:3,6-dianhydrohexitol used in the melt polycondensation in order to obtain a high degree of polymerization responsible for high heat resistance and transparency, as well as excellent mechanical properties of the bio-based polycarbonate ester.

1,4:3,6-Dianhydrohexitol may be in the form of powder, flake, or an aqueous solution. If 1,4:3,6-dianhydrohexitol is exposed to air for a long period of time, however, it may be readily oxidized and discolored, which may lead to unsatisfactory color and molecular weight of the final polymer. Thus, it may be necessary to minimize exposure of 1,4:3,6-dianhydrohexitol to air. Once 1,4:3,6-dianhydrohexitol is exposed to air, it is preferably stored with a deoxidizing agent such as an oxygen absorber. Further, it is very important to remove impurities contained in 1,4:3,6-dianhydrohexitol if it is prepared by a multi-step process. Specifically, in the purification of 1,4:3,6-dianhydrohexitol by distillation, it is critical to remove a trace level of acidic liquid components that can be removed by an initial separation and alkali metal components that can be removed by a residue separation. Each of the acidic liquid components and alkali metal components may be kept at a level of 10 ppm or lower, preferably 5 ppm or lower, more preferably 3 ppm or lower.

Examples of the compound of Formula 4 may be at least one compound selected from the group consisting of dimethyl carbonate, diethyl carbonate, di-t-butyl carbonate, diphenyl carbonate, ditolyl carbonate, and a substituted carbonate. Since the polycarbonate melt polycondensation reaction is carried out under a reduced pressure condition, the compound of Formula 4 may be specifically dimethyl carbonate, diethyl carbonate, di-t-butyl carbonate, diphenyl carbonate, or ditolyl carbonate. More specifically, the compound of Formula 4 may be diphenyl carbonate.

In Step (2) above, other diol compounds than 1,4:3,6-dianhydrohexitol may further be used, and they are not specifically limited. Various compounds including primary, secondary, or tertiary diol compounds may be used in combination with 1,4:3,6-dianhydrohexitol. In this case, if the amount of diol compounds other than 1,4:3,6-dianhydrohexitol is y mole, the amount of 1,4:3,6-dianhydrohexitol is to be (1−y) mole.

Particularly, if these diol compounds are a petrochemical-based diol compound, they may be used such that the bio-based content (ASTM-D6866) in the final polymer derived from 1,4:3,6-dianhydrohexitol is at least 1 mol %. In such event, y satisfies 0<y<0.99. That is, these diol compounds may be used in an amount of less than 99 mol % based on 100 mol % of 1,4:3,6-dianhydrohexitol.

Here, these diol compounds preferably have a single or fused saturated homocyclic or heterocyclic ring in their molecular center for high heat resistance and transparency, as well as improved weatherability and UV stability of the polycarbonate ester prepared. Meanwhile, in general, the bigger the ring in a diol having hydroxyl groups in a symmetrical structure, the higher the heat resistance of the polycarbonate ester. However, the optical properties thereof do not depend on the ring size and the position of the hydroxyl groups in the diol, but vary with the characteristics of the raw materials. As the ring size is bigger, it is more difficult to commercially produce the compound and utilize same.

These diol compounds may be selected from the group consisting of 1,2-cyclohexanedimethanol, 1,3-cyclohexanedimethanol, 1,4-cyclohexanedimethanol, tricyclodecandimethanol, 3,9-bis(1,1-dimethyl-2-hydroxyethyl)-2,4,8,10-tetraoxaspiro[5.5]undecane, 2,2-bis(4-hydroxycyclohexyl)propane, and tetrahydro-2,5-furandimethanol derivable from a bio-based material. Preferred are 1,4-cyclohexanedimethanol, 2,2-bis(4-hydroxycyclohexyl)propane, and tetrahydro-2,5-furandimethanol.

The cis/trans ratio of the compound of Formula 3 may be 1%/99% to 99%/1%, preferably 10%/90% to 90%/10%, more preferably 20%/80% to 80%/20%. Further, the cis/trans weight ratio of cyclohexanedicarboxylate in the repeating unit of Formula 1 may be 1%/99% to 99%/1%, preferably 20%/80% to 80%/20%, more preferably 30%/70% to 70%/30%.

As the content of trans-cyclohexanedicarboxylate unit in the repeating unit of Formula 1 increases, the Tg of the polycarbonate ester is higher, resulting in improved heat resistance with relatively reduced transparency. In contrast, as the trans content decreases, the Tg of the polycarbonate ester is lower with reduced heat resistance and improved transparency. Thus, the cis/trans ratio of the cyclohexanedicarboxylate unit in the repeating unit of Formula 1 is preferably controlled within 20%/80% to 80%/20%, more preferably 30%/70% to 70%/30%, to thereby adjust the heat resistance and transparency.

In the melt polycondensation of Step (2), the total amount of the compounds of Formula 3 and of Formula 4 may be 0.7 to 1.3 moles, preferably 0.9 to 1.1 moles, more preferably 0.95 to 1.05 moles, based on 1 mole of 1,4:3,6-dianhydrohexitol.

The temperature of the melt polycondensation reaction may be elevated at a rate of 0.1 to 10° C./min, preferably 0.2 to 5° C./min, more preferably 0.5 to 2° C./min. The reaction temperature may be 120 to 320° C., preferably 150 to 290° C., more preferably 180 to 270° C. The reaction time may be 1 to 10 hours, preferably 1.5 to 8 hours.

Further, phenol produced as a by-product of the melt polycondensation should be distilled off from the reaction system in order to shift the reaction equilibrium towards production of the polycarbonate ester. In particular, if the rate of temperature elevation falls out of the above ranges, phenol may evaporate or sublime together with the raw materials. The bio-based polycarbonate ester may be prepared in a batch or continuous process.

In the method for producing a bio-based polycarbonate ester according to the present invention, a polycondensation catalyst may further be used for enhancing the reactivity of the melt polycondensation reaction. Any conventional alkali metal and/or alkali earth metal catalyst commonly used in polycarbonate melt polycondensation may be used as such polycondensation catalyst. The catalyst may be used in combination with a basic ammonium or amine, a basic phosphorous, or a basic boron compound. However, it is preferable to use the catalyst alone. Examples of the alkali metal catalysts may be LiOH, NaOH, KOH, CsOH, $Li_2CO_3$, $Na_2CO_3$, $K_2CO_3$, $Cs_2CO_3$, LiOAc, NaOAc, KOAc, CsOAc, and the like. Examples of the alkali earth metal catalysts may be $Ca(OH)_2$, $Ba(OH)_2$, $Mg(OH)_2$, $Sr(OH)_2$, $CaCO_3$, $BaCO_3$, $MgCO_3$, $SrCO_3$, $Ca(OAc)_2$, $Ba(OAc)_2$, $Mg(OAc)_2$, $Sr(OAc)_2$, and the like. Further, these alkali metal and/or alkali earth metal catalysts may be used alone or in combination of two or more.

The polycondensation catalyst may be used in an amount of 0.1 to 30 μmole, preferably 0.5 to 25 μmole, more preferably 0.5 to 20 μmole, per 1 mole of the diols (i.e., 1,4:3,6-dianhydrohexitol and other diol compounds) used in the melt polycondensation reaction. The polycondensation catalyst may be employed at any time regardless of the progress of the melt polycondensation reaction. But it is preferable to introduce the catalyst before initiation of the melt polycondensation reaction. If the amount of the polycondensation catalyst is less than 0.1 μmole per 1 mole of the diols, it is difficult to achieve a targeted degree of polymerization. If the amount of the catalyst exceeds 30 μmole, it causes side reactions, which directly and adversely affect the target properties, resulting in, e.g., reduced transparency.

Further, the method for preparing a bio-based polycarbonate ester according to the present invention may employ temperature elevation and depressurization in a stepwise manner in order to rapidly remove by-products and to promote the polymerization reaction. Specifically, the melt polycondensation reaction in Step (2) may comprise a first reaction zone and a second reaction zone.

More specifically, after the raw materials are introduced, the first reaction zone may be operated at a temperature of 130 to 250° C., preferably 140 to 240° C., more preferably 150 to 230° C., for 0.1 to 10 hours, preferably 0.5 to 3 hours. When the pressure is reduced in these temperature ranges, the reduced pressure may be 5 to 700 Torr, preferably 10 to 600 Torr.

The second reaction zone may be operated at a temperature of 210 to 290° C., preferably 220 to 280° C., more preferably 230 to 270° C., for 0.1 to 10 hours, preferably 0.5 to 3 hours. When the pressure is reduced in these temperature ranges, the reduced pressure may be 20 Torr or less, preferably 10 Torr or less.

Further, in the method for manufacturing a bio-based polycarbonate ester according to the present invention, various additives may be used, if necessary. For example, the additives may include an antioxidant or a thermal stabilizer such as hindered phenol, hydroquinone, phosphite, and a substituted compound thereof; a UV-absorber such as resorcinol, salicylate, etc.; a color-protecting agent such as phosphite, hydrophosphite, etc.; and a lubricant such as montanic acid, stearyl alcohol, etc. Also, a dye and a pigment may be used as a colorant; carbon black may be used as a conductive agent, colorant, or nucleation agent; and a flame retardant, a plasticizer, an antistatic agent, and the like may be used. The aforementioned additives may be used in an amount that does not adversely affect the properties, especially transparency, of the final polymer.

The bio-based polycarbonate ester comprising a repeating unit of Formula 1 and prepared by the method for manufacturing a polycarbonate ester according to the present invention may have an intrinsic viscosity (hereinafter abbreviated as "IV") of 0.3 to 2.0 dL/g.

MODE FOR THE INVENTION

Hereinafter, the present invention is described in more detail by following examples. However, these examples are provided only for illustration purposes, and the present invention is not limited thereto.

Preparation Example 1: Preparation of DPCD from CHDA 100 g (0.58 moles) of CHDA (SK Chemicals) with a cis/trans weight ratio of 88/12 and 200 g of methylene chloride were charged to a 1 L four-neck-round-bottom flask equipped with a 4-blade agitator, an inlet for feeding phosgene and nitrogen gas, an outlet for discharging gases, and a thermometer. The mixture was stirred at room temperature. 1.28 moles of phosgene gas were fed to the flask under atmospheric pressure for 10 hours, and then nitrogen gas was fed to the flask for 2 hours for distilling off dissolved phosgene and hydrochloric acid gas, thereby yielding a transparent and homogeneous reaction solution. An analysis of the reaction solution by gas chromatography (GC) showed that the ratio of CHDC was 49% by weight and that the reaction yield was 86%.

After 50% by weight of the methylene chloride initially supplied was distilled off from the reaction solution, a phenol solution in which 121 g (1.28 moles) of phenol were dissolved in 121 g of methylene chloride was added through a dropping funnel to the reaction solution for 2 hours, and the mixture was stirred for 1 hour. Upon termination of the reaction, methylene chloride was distilled off from the reaction solution, and the crude DPCD thus obtained was purified by recrystallization in ethanol. The recrystallized DPCD was dried at 90° C. under vacuum for 24 hours to obtain 154 g of DPCD. A $^1$H NMR spectrum of DPCD thus obtained is shown in FIG. 1. The reaction yield was 82%, and the purity of DPCD according to a GC analysis was 99.92%. In the above reaction conditions, the cis/trans ratio was changed to 82%/18%.

Preparation Example 2: Preparation of DPCD from CHDA

The procedures of Preparation Example 1 above were repeated to prepare DPCD, except that 1.27 g (0.017 moles) of dimethyl formamide, besides CHDA and methylene chloride, were further added as an organic catalyst. The reaction yield was 82%, and the purity of DPCD according to a GC analysis was 99.9%. In the above reaction conditions, the cis/trans ratio was changed to 82%/18%.

Preparation Example 3: Preparation of DPCD from CHDA 30 g (0.17 moles) of CHDA (SK Chemicals) with a cis/trans ratio of 88%/12% and 300 g of CHDC were charged to a 1 L four-neck-round-bottom flask equipped with a 4-blade agitator, an inlet for feeding phosgene and nitrogen gas, an outlet for discharging gases, and a thermometer. The mixture was stirred at room temperature. 0.37 moles of phosgene gas was fed to the flask under atmospheric pressure for 5 hours, and then nitrogen gas was fed to the flask for 2 hours for distilling off dissolved phosgene and hydrochloric acid gas, thereby yielding a transparent and homogeneous reaction solution. An analysis of the reaction solution by GC showed that the ratio of CHDC was 99% by weight and that the reaction yield was 94%.

A phenol solution in which 32 g (0.34 moles) of phenol were dissolved in 32 g of methylene chloride was added through a dropping funnel to the reaction solution for 2 hours, and the mixture was stirred for 1 hour. Upon termination of the reaction, CHDC and methylene chloride were distilled off from the reaction solution, and the crude DPCD thus obtained was purified by recrystallization in ethanol. The recrystallized DPCD was dried at 90° C. under vacuum for 24 hours to obtain 50 g of DPCD. The reaction yield of DPCD was 88%, and the purity of DPCD according to a GC analysis was 99.96%. In the above reaction conditions, the cis/trans ratio was changed to 82%/18%.

Preparation Example 4: Preparation of DPCD from DMCD 100 g (0.50 moles) of DMCD (SK Chemicals) with a cis/trans ratio of 77%/23% and 2.0 g (0.015 moles) of aluminum chloride were charged to a 1 L four-neck-round-bottom flask equipped with a 4-blade agitator, an inlet for feeding phosgene and nitrogen gas, an outlet for discharging gases, and a thermometer. The mixture was stirred at room temperature. 1.10 moles of phosgene gas were fed to the flask under atmospheric pressure for 10 hours, and then nitrogen gas was fed to the flask for 2 hours for distilling off dissolved phosgene and methyl chloride gas, thereby yielding a transparent and homogeneous reaction solution. An analysis of the reaction solution by GC showed that the ratio of CHDC was 98% by weight and that the reaction yield was 92%.

A phenol solution in which 100 g (1.06 moles) of phenol were dissolved in 100 g of methylene chloride was added through a dropping funnel to the reaction solution for 2 hours, and the mixture was stirred for 1 hour. Upon termination of the reaction, methylene chloride was distilled off from the reaction solution, and the crude DPCD thus obtained was purified by recrystallization in ethanol. The recrystallized DPCD was dried at 90° C. under vacuum for 24 hours to obtain 150 g of DPCD. The reaction yield of DPCD was 92%, and the purity of DPCD according to a GC analysis was 99.94%. In the above reaction conditions, the cis/trans ratio was changed to 79%/21%.

Figure 3:
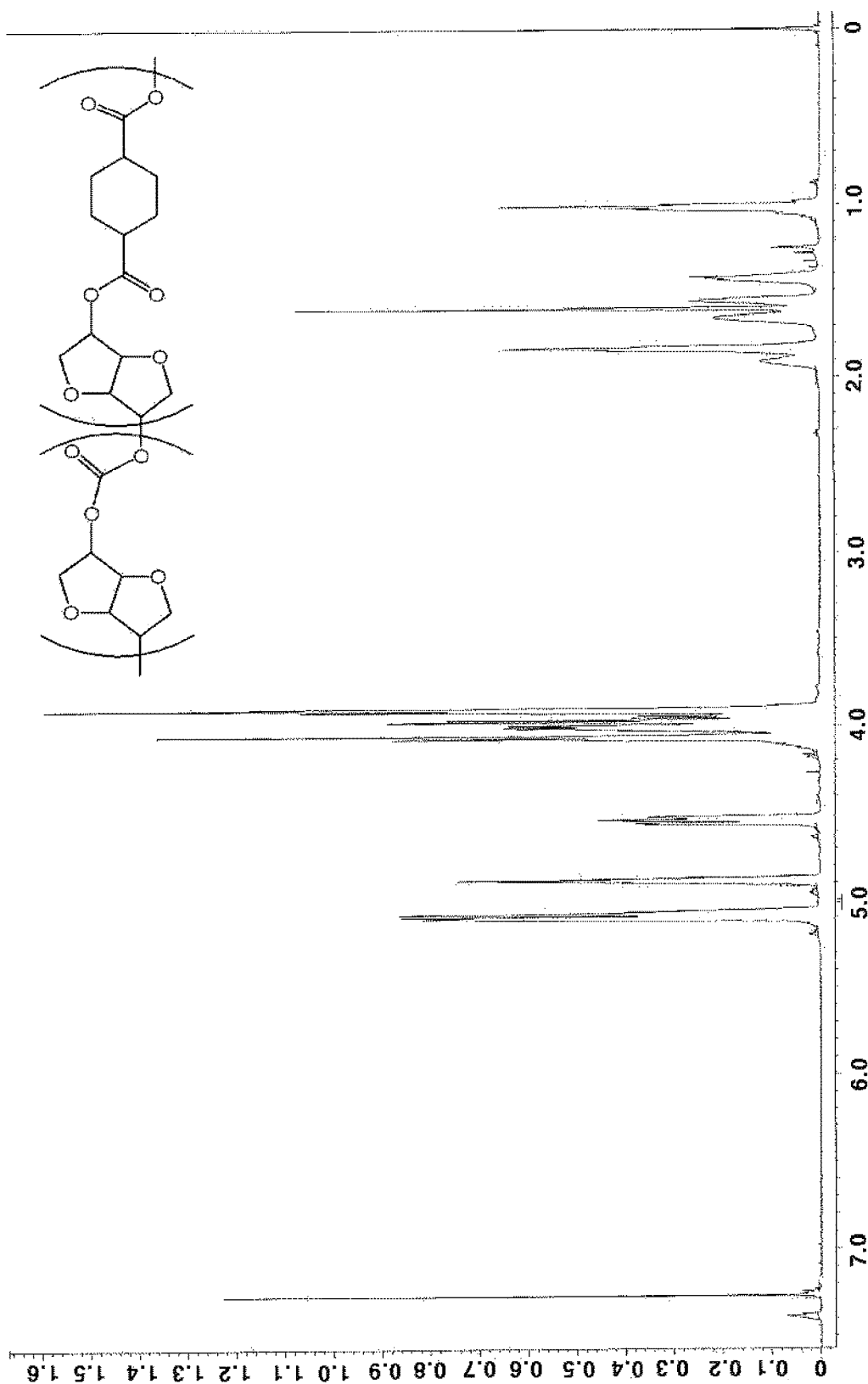
FIG. 3 is a $^1$H NMR spectrum of a bio-based polycarbonate ester prepared in Example 1.
Figure 4:
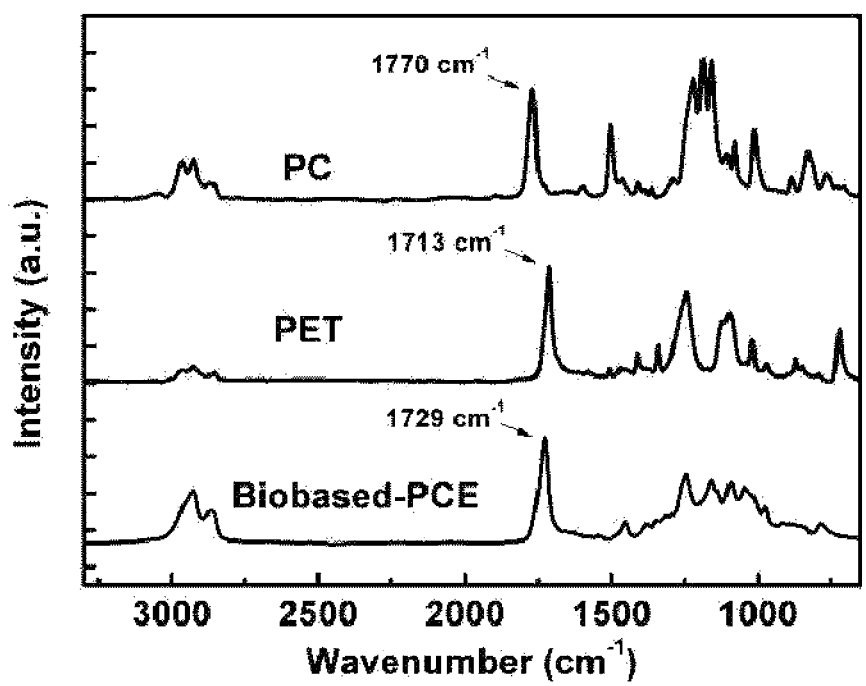
FIG. 4 is an IR spectrum of a bio-based polycarbonate ester prepared in Example 1.

Example 1: Preparation of Bio-Based Polycarbonate Ester 1,995 g (13.7 moles) of isosorbide ("ISB"; Roquette Freres), 443 g (1.37 moles) of DPCD obtained from Preparation Example 1, 2,632 g (12.3 moles) of DPC (Changfeng), and $6.1 \times 10^{-4}$ g ($1.9 \times 10^{-3}$ mmoles) of cesium carbonate ($Cs_2CO_3$), as a catalyst, were charged to a 5 L bench-scale reactor for polycondensation. The mixture was heated to 150° C. Once the temperature reached 150° C., the pressure was reduced to 400 Torr, and the temperature was then elevated to 190° C. over 1 hour. During the temperature elevation, phenol was generated as a by-product of the polymerization reaction. When the temperature reached 190° C., the pressure was reduced to 100 Torr and maintained for 20 minutes, and then the temperature was elevated to 230° C. over 20 minutes. Once the temperature reached 230° C., the pressure was reduced to 10 Torr, and then the temperature was elevated to 250° C. over 10 minutes. The pressure was reduced to 1 Torr or less at 250° C., and the reaction continued until it reached a target stirring torque. Upon arrival at the target stirring torque, the reaction was terminated. The polymerized product was pressurized and discharged as a strand, which was rapidly cooled in a water bath and then cut into chips. The cis/trans ratio of cyclohexanedicarboxylate unit in the polymer chains obtained as a final product was changed to 70%/30%. The cis content decreased, whereas the trans content increased, as compared with its starting material DPCD. The bio-based polycarbonate ester thus prepared had a Tg of 162° C. and an IV of 0.62 dL/g. $^1$H NMR and IR spectra of the final product are shown in FIGS. 3 and 4.

Example 2 to 6: Preparation of Bio-Based Polycarbonate Ester

The procedures of Example 1 above were repeated, except that the raw materials for polymers were as described in Table 1 below.

Comparative Example 1: Preparation of Bio-Based Polycarbonate Ester from CHDM

The same procedures as Example 1 were repeated to prepare a bio-based polycarbonate ester, except that 10.1 g (0.07 moles) of CHDM (SK Chemicals), along with DPCD and DPC, and 92.1 g (0.63 moles) of isosorbide (Roquette Freres) were used. The cis/trans ratio of cyclohexanedicarboxylate unit in the polymer chains of the final product was changed to 38%/62%. The bio-based polycarbonate ester thus prepared had a Tg of 129° C. and an IV of 0.51 dL/g.

Comparative Example 2: Preparation of Isosorbide Homopolycarbonate

The same procedures as Example 1 were repeated to prepare an isosorbide homopolycarbonate, except that 150.0 g (0.7 moles) of DPC (Aldrich) were used without DPCD. The isosorbide homopolycarbonate thus obtained had a Tg of 160° C. and an IV of 0.49 dL/g.

Comparative Example 3: Preparation of Isosorbide/DPCD Homopolyester

The same procedures as Example 1 were repeated to prepare a bio-based isosorbide/DPCD polyester, except that 227.1 (0.7 moles) of DPCD were used without DPC. The cis/trans ratio of cyclohexanedicarboxylate unit in the polymer chains of the final product was changed to 36%/64%. The bio-based polycarbonate ester thus prepared had a Tg of 130° C. and an IV of 0.46 dL/g.

Comparative Example 4: Preparation of DDDA Copolymerized Isosorbide Polycarbonate Ester The same procedures as Example 1 were repeated to prepare a dodecanedioic acid (hereinafter abbreviated as "DDDA," Aldrich) copolymerized isosorbide polycarbonate ester, except that 32.2 g (0.14 moles) of DDDA, instead of DPCD, and 120.0 g (0.56 moles) of DPC (Aldrich) were used. The DDDA copolymerized isosorbide polycarbonate ester had a Tg of 121° C. and an IV of 0.34 dL/g.

Comparative Example 5: Preparation of Bio-Based Polycarbonate Ester with High Cis Content The same procedures as Example 1 were repeated to prepare a bio-based polycarbonate ester, except that 97.3 g (0.3 moles) of DPCD having a cis/trans ratio of 90/10 were used. The cis/trans ratio of cyclohexanedicarboxylate unit in the polymer chains of the final product was changed to 85%/15%. The bio-based polycarbonate ester thus prepared had a Tg of 113° C. and an IV of 0.37 dL/g.

<Determination of Light Transmittance>

Light transmittance was measured for an extruded sheet having a thickness of 4 mm according to ASTM D1003.

<Determination of Tensile Strength>

Tensile strength was measured according to ASTM D638.

<Determination of Flexural Strength>

Flexural strength was measured according to ASTM D790.

<Determination of Impact Strength>

Impact strength was measured for a notched sample at room temperature according to ASTM D256.

<Determination of Heat Deflection Temperature>

Heat deflection temperature was measured under a load of 1.80 MPa according to ASTM D648.

<Determination of Pencil Hardness>

Pencil hardness was measured by a pencil hardness tester according to ASTM D3502.

The compositions and the properties of the polymer samples obtained in Examples 1 to 6 and Comparative Examples 1 to 5 are shown in Table 1 below.

TABLE 1

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp Ex. 5 |
|---|---|---|---|---|---|---|---|---|---|---|---|
| ISB | 1 | 1 | 1 | 1 | 1 | 1 | 0.9 | 1 | 1 | 1 | 1 |
| CHDM | 0 | 0 | 0 | 0 | 0 | 0 | 0.1 | 0 | 0 | 0 | 0 |
| DPC | 0.9 | 0.8 | 0.7 | 0.6 | 0.5 | 0.4 | 0.4 | 1 | 0 | 0.8 | 0.4 |
| DPCD | 0.1 | 0.2 | 0.3 | 0.4 | 0.5 | 0.6 | 0.6 | 0 | 1 | 0 | 0.6 |
| DDPA | 0 | 0 | 0 | 0 | 0 | 0 | 0 | 0 | 0 | 0.2 | 0 |
| cis/trans ratio (%/%) | 70/30 | 42/58 | 49/51 | 49/51 | 42/58 | 40/60 | 38/62 | — | 36/64 | — | 85/15 |
| IV (dL/g) | 0.62 | 0.58 | 0.68 | 0.65 | 0.61 | 0.63 | 0.51 | 0.49 | 0.46 | 0.34 | 0.37 |
| Tg (° C.) | 162 | 157 | 154 | 150 | 146 | 143 | 129 | 160 | 130 | 121 | 113 |
| Light transmittance (%) | 92 | 92 | 92 | 92 | 92 | 92 | 91 | 89 | 89 | 87 | 90 |
| Tensile | 21 | 44 | 65 | 83 | 107 | 131 | 136 | 5 | 212 | — | — |

TABLE 1-continued

|  | Ex. 1 | Ex. 2 | Ex. 3 | Ex. 4 | Ex. 5 | Ex. 6 | Comp. Ex. 1 | Comp. Ex. 2 | Comp. Ex. 3 | Comp. Ex. 4 | Comp Ex. 5 |
|---|---|---|---|---|---|---|---|---|---|---|---|
| strength (MPa) |  |  |  |  |  |  |  |  |  |  |  |
| Flexural strength (MPa) | 37 | 64 | 93 | 121 | 149 | 174 | 179 | 12 | 283 | — | — |
| Flexural modulus (MPa) | 3,298 | 3,089 | 2,852 | 2,632 | 2,421 | 2,205 | 2,198 | 3,496 | 1,488 | — | — |
| Impact strength (J/m) | 13 | 36 | 55 | 68 | 77 | 93 | 101 | 4 | 129 | — | — |
| Heat deflection temperature (° C.) | 124 | 124 | 122 | 119 | 116 | 112 | 107 | 123 | 110 | — | — |
| Pencil hardness | 5H | 4H | 3H | 2H | H | F | HB | 5H | 2B | — | — |

As shown in Table 1 above, the bio-based polycarbonate ester prepared from 1,4-diphenyl-cyclohexanedicarboxylate of Formula 3 prepared according to the present method has improved heat resistance, surface hardness, and impact strength over conventional diol-modified isosorbide polycarbonates.

In Comparative Example 4, the optical transmittance was reduced from a level of highly transparent poly(methyl methacrylate) (PMMA) to a level of commodity BPA-based polycarbonate due to the presence of a long chain aliphatic dicarboxylic acid that induces an increase in the photoelastic coefficient. It was also found that the glass transition temperature was relatively low.

In particular, in Comparative Example 5, the glass transition temperature was significantly lowered as compared with Example 1 since the cis content of cyclohexanedicarboxylate unit in the polymer chains was high. It was also noted that the optical transmittance was relatively low.

Accordingly, the method for preparing a bio-based polycarbonate ester according to the present invention can control the properties of the bio-based polycarbonate ester attributable to the carbonate bond and the ester bond by adjusting their ratio, depending on desirable properties thereof. Further, the bio-based polycarbonate ester prepared according to the present invention has high heat resistance and transparency, and thus can be used in various applications, e.g., a substitute for automobile glass, an optical lens or film, a feeding bottle, a food container, etc.

The invention claimed is:

1. A method for preparing a bio-based polycarbonate ester comprising a repeating unit of Formula 1, comprising the steps of:

(1) subjecting a reaction mixture comprising a compound of Formula 2 and a halogenation agent to convert the compound of Formula 2 into an intermediate reactant of Formula 2a and then subjecting the intermediate reactant of Formula 2a to a nucleophilic reaction with phenol to yield a diphenyl ester of Formula 3; and (2) subjecting the diphenyl ester of Formula 3 prepared in step (1), a compound of Formula 4, and 1,4:3,6-dianhydrohexitol to a polycarbonate melt polycondensation reaction to yield the bio-based polycarbonate ester comprising the repeating unit of Formula 1:

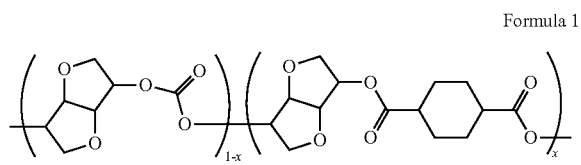

Formula 1

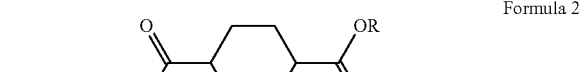

Formula 2

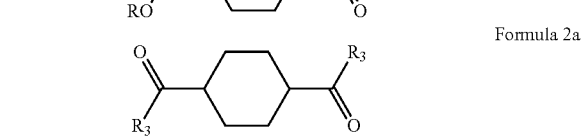

Formula 2a

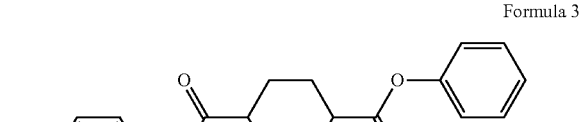

Formula 3

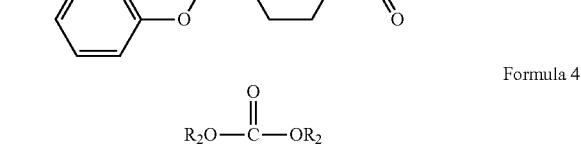

Formula 4 wherein

R is methyl or hydrogen, $R_1$ and $R_2$ are each independently a substituted or unsubstituted $C_1$-$C_{18}$ aliphatic group, or a substituted or unsubstituted $C_1$-$C_{18}$ aromatic group, $R_3$ is F, Cl, or Br, and x is a real number of 0<x<1.

2. The method of claim 1, wherein $R_3$ is Cl.

3. The method of claim 1, wherein the halogenation agent in step (1) is selected from the group consisting of phosgene, triphosgene, thionyl chloride, oxalyl chloride, phosphorus trichloride, phosphorous pentachloride, phosphorous pentabromide, and cyanuric fluoride.

4. The method of claim 1, wherein the conversion of the compound of Formula 2 into the intermediate reactant of Formula 2a in step (1) is carried out at a reaction temperature of −30 to 150° C. under atmospheric pressure for a reaction time of 5 minutes to 48 hours.

5. The method of claim 1, wherein the phenol is used in step (1) in an amount of 1 to 3 times the total moles of the compound of Formula 2.

6. The method of claim 1, wherein the reaction mixture of step (11 further comprises with addition of at least one compound selected from the group consisting of tetrahydro-2,5-dimethyl-furandicarboxylate, 1,2-dimethyl-cyclohexanedicarboxylate, 1,3-dimethyl-cyclohexanedicarboxylate, decahydro-2,4-dimethyl-naphthalenedicarboxylate, decahydro-2,5-dimethyl-naphthalenedicarboxylate, decahydro-2,6-dimethyl-naphthalenedicarboxylate, decahydro-2,7-dimethyl-naphthalenedicarboxylate, tetrahydro-2,5-furandicarboxylic acid, 1,2-cyclohexanedicarboxylic acid, 1,3-cyclohexanedicarboxylic acid, decahydro-2,4-naphthalenedicarboxylic acid, decahydro-2,5-naphthalenedicarboxylic acid, decahydro-2,6-naphthalenedicarboxylic acid, and decahydro-2,7-naphthalenedicarboxylic acid, wherein the at least one compound is converted to a corresponding diphenyl ester thereof through step (1).

7. The method of claim 1, wherein the compound of Formula 4 is dimethyl carbonate, diethyl carbonate, di-t-butyl carbonate, diphenyl carbonate, or ditolyl carbonate.

8. The method of claim 1, wherein the melt polycondensation reaction in step (2) takes place in the presence of at least one additional diol compound selected from the group consisting of 1,2-cyclohexanedimethanol, 1,3-cyclohexanedimethanol, 1,4-cyclohexanedimethanol, tricyclodecandimethanol, 3,9-bis(1,1-dimethyl-2-hydroxyethyl)-2,4,8,10-tetraoxaspiro[5.5]undecane, 2,2-bis(4-hydroxycyclohexyl)propane, and tetrahydro-2,5-furandimethanol derivable from a bio-based material.

9. The method of claim 8, wherein the additional diol compound is used in an amount of less than 99 mol %, based on 100 mol % of 1,4:3,6-dianhydrohexitol.

10. The method of claim 1, wherein the melt polycondensation reaction in step (2) comprises a first reaction zone and a second reaction zone, wherein the first reaction zone is operated at a temperature of 130 to 250° C. under a reduced pressure of 5 to 700 Torr for 0.1 to 10 hours, and the second reaction zone is operated at a temperature of 210 to 290° C. under a reduced pressure of 20 Torr or lower for 0.1 to 10 hours.

11. The method of claim 1, wherein a ratio of cis/trans cyclohexanedicarboxylate unit in the repeating unit of Formula 1 is in the range of 1%/99% to 99%/1%.

* * * * *